(12) United States Patent　　(10) Patent No.:　US 12,565,985 B2

Christensen　　(45) Date of Patent:　Mar. 3, 2026

---

(54) LIGHT HOOK

(71) Applicant: 9. Solutions Technology Co., Limited,
Hong Kong (CN)

(72) Inventor: Bo Christensen, Nordborg (DK)

( * ) Notice: Subject to any disclaimer, the term of this
patent is extended or adjusted under 35
U.S.C. 154(b) by 79 days.

(21) Appl. No.: 18/404,896

(22) Filed: Jan. 5, 2024

(65) Prior Publication Data

US 2025/0224100 A1　　Jul. 10, 2025

(51) Int. Cl.
　　*F21V 21/088*　　(2006.01)
　　*F16B 2/10*　　(2006.01)
　　*F21W 131/406*　　(2006.01)

(52) U.S. Cl.
　　CPC .............. *F21V 21/088* (2013.01); *F16B 2/10*
　　(2013.01); *F21W 2131/406* (2013.01)

(58) Field of Classification Search
　　CPC .... F16B 2/10; F16B 2/06; F16B 2/065; F16B
　　2/185; F16L 3/105; F16L 3/1075; F21V
　　21/088; F21W 2131/406
　　USPC ...... 24/489, 135 R–135 K, 279; 248/229.13,
　　248/229.23, 230.4, 231.51
　　See application file for complete search history.

(56) References Cited

U.S. PATENT DOCUMENTS 4,445,657 A　*　5/1984　Breckenridge ..... A01M 7/0053
　　　　　　　　　　　　　　　　248/74.1
6,568,644 B2　*　5/2003　Pedersen ................. B60R 9/045
　　　　　　　　　　　　　　　　248/316.5

9,482,368 B1　*　11/2016　Hung ......................... F16B 2/10
10,486,004 B1　*　11/2019　Solis, Jr. ............... F16L 3/1075
10,765,185 B1　*　9/2020　Wengerd ................. F16B 2/185
2003/0037662 A1　*　2/2003　Hsieh ................... G10D 13/065
　　　　　　　　　　　　　　　　84/422.3
2003/0075651 A1　*　4/2003　Pedersen .................... B62J 7/08
　　　　　　　　　　　　　　　　248/229.13
2003/0209128 A1　*　11/2003　Hsieh ......................... F16B 2/10
　　　　　　　　　　　　　　　　84/422.3
2012/0266835 A1　*　10/2012　Harman .................... F01L 1/18
　　　　　　　　　　　　　　　　123/90.39
2018/0066684 A1　*　3/2018　Burnett .................. F16B 2/005
2018/0320721 A1　*　11/2018　McCarty ................. F16K 31/00

* cited by examiner

*Primary Examiner* — Christopher Garft
(74) *Attorney, Agent, or Firm* — Bruce Stone LLP;
Joseph A. Bruce

(57)　　　　ABSTRACT

A light hook includes: a first fastener includes two clamping
portions and a slot formed therebetween; a second fastener
pivoted to the first fastener, and has two locking protrusions;
a pulling member includes a body and two side plates, the
two side plates are connected to two opposite sides of the
body, and each have a pivot end pivotally connected to the
second fastener, the two side plates each include a connect-
ing portion located between the pivot end and a pulling end
of the body; a connecting bar includes two inserting ends
fixed to the connecting portions, respectively, and an insert-
ing hole is formed between the two inserting ends; and a
fixing member includes an inserting portion and a fixing
portion, the fixing portion is abutted against the two clamp-
ing portions, the inserting portion is inserted through the
inserting hole, and a nut is screwed on the inserting portion.

6 Claims, 6 Drawing Sheets

LIGHT HOOK

BACKGROUND

Field of the Invention

The present invention relates to a fastener, and more particularly to a light hook structure.

Description of Related Art

A general stage light is installed on the truss or column on a stage by a light hook. The conventional structure of the light hook is shown in FIGS. 1A and 1B, including: a first pivot member 80 and a second pivot member 90. The first pivot member 80 has one end hinged with one end of the second pivot member 90, so that the first pivot member 80 can pivot relative to the second pivot member 90. The other end of the first pivot member 80 is provided with two clamping portions 81. A slot 82 is formed between the two clamping portions 81, and the other end of the second pivot member 90 is provided with a locking member 91. The outer surface of the locking member 91 includes a plurality of external threads 911, a nut 92 is sleeved on the locking member 91 and includes a plurality of internal threads, and the nut 92 is screwed to the locking member 91, so that the user can adjust the relative position of the nut 92 on the locking member 91 by rotating the nut 92.

Please refer to FIG. 1A, when the light hook is in the locking position, the locking member 91 is inserted into the slot 82, and the nut 92 is pressed against the two clamping portions 81. At this time, the first pivot member 80 and the second pivot member 90 embrace the truss or column, and then the light hook can be fixed to the truss or column by tightening the nut 92; When the user needs to remove the light hook from the truss or column, she/he needs to rotate the nut 92 until the locking member 91 can detach from the slot 82 from an open end 821 of the slot 82. However, under normal circumstances, the nut 92 needs to rotate almost to the end of the locking member 91 in order for the locking member 91 to detach from the slot 82. Therefore, the action of rotating the nut 92 needs to be maintained for a considerable amount of time, making it difficult and time-consuming to disassemble the light hook.

SUMMARY

The invention provides a light hook, the main objective of which is to provide a light hook that can be quickly disassembled and conveniently used.

To achieve the above objective, the light hook provided by the invention comprises:

a first fastener, one end of the first fastener including two clamping portions, and a slot formed between the two clamping portions, and one end of the slot being an open end;

a second fastener having one end pivotally connected to the first fastener, wherein the second fastener is pivotally connected to another end of the first fastener, another end of the second fastener includes two locking protrusions, the two locking protrusions are spaced at a distance, and an inserting space is formed between the two locking protrusions;

a pulling member including a body and two side plates, wherein one end of each of the two side plates is connected to two opposite sides of one end of the body, and another end of each of the two side plates is a pivot end, each of the pivot ends is swingably and pivotally connected to the second fastener, the pivot ends and the second fastener together define a pivot center, enabling the pulling member to pivot relative to the second fastener about the pivot center, another end of the body is a pulling end, the two side plates each include a connecting portion, which is located between the pivot end and the pulling end;

a connecting bar including a first inserting end and a second inserting end opposite the first inserting end, wherein the first inserting end is fixed to one of the connecting portions, the second inserting end is fixed to another of the connecting portions, and an inserting hole is formed between the first inserting end and the second inserting end, so that, when the pulling member pivots around the pivot center, the connecting bar accordingly swings and displaces around the pivot center; and a fixing member including an inserting portion and a fixing portion connected to each other, wherein the fixing portion is abutted against the two clamping portions, the inserting portion is inserted through the inserting hole, and then a nut is screwed on the inserting portion, so that, when the connecting bar pivots and displaces around the pivot center, the fixing member swings accordingly.

It can be learned from the above that it only needs to reversely pull the pulling end of the pulling member to change the position of the connecting bar, which consequently drives the fixing member to move and makes the fixing portion move away from the two clamping portions, so that the user can reversely pull the inserting portion out of the slot from the open end, and then the light hook can be unlocked to achieve quick disassembly and assembly.

DETAILED DESCRIPTION

Figure 1A:
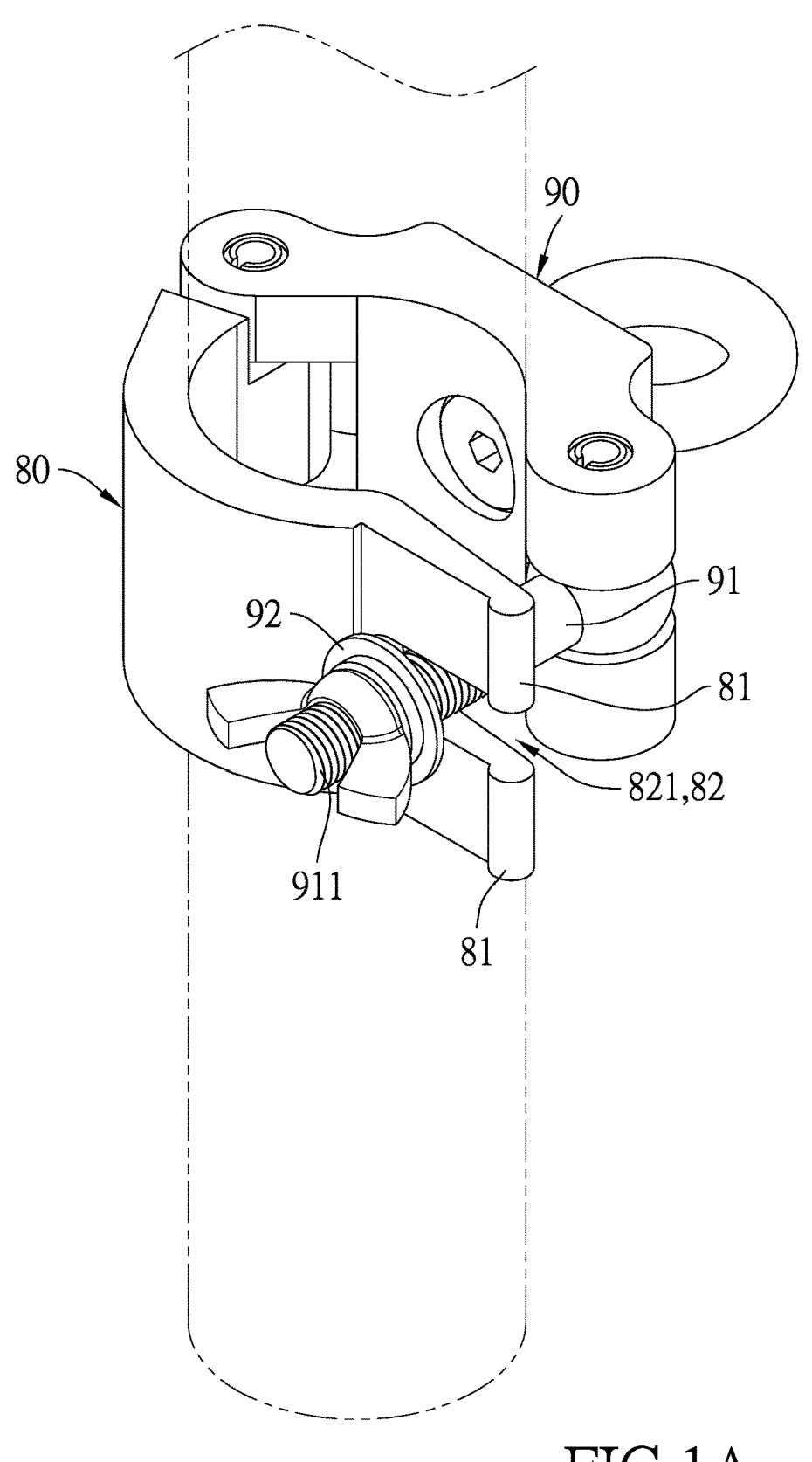
FIG. 1A is a schematic diagram of the conventional light hook in the locked state.
Figure 1B:
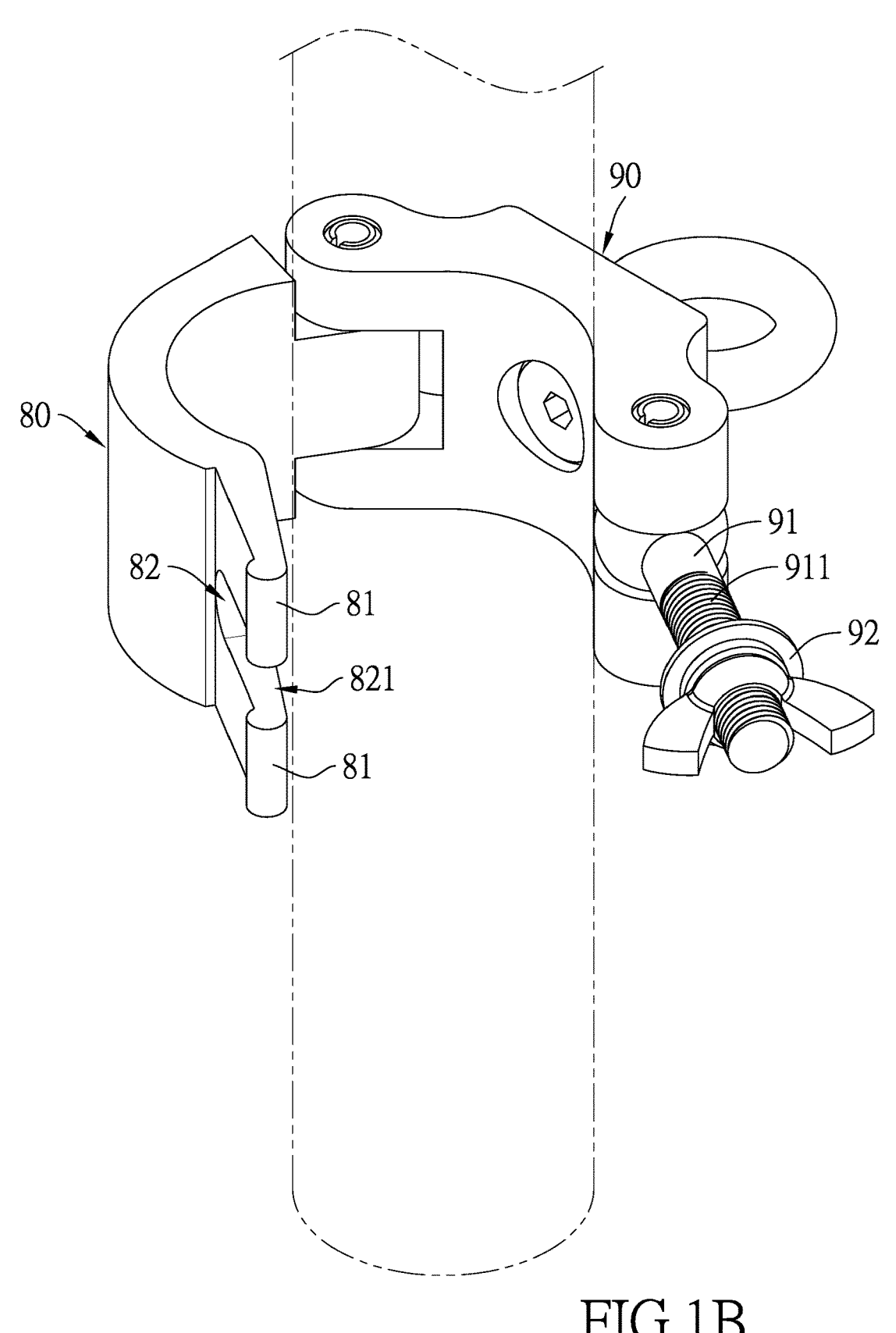
FIG. 1B is a schematic diagram of the conventional light hook in the unlocked state.
Figure 2:
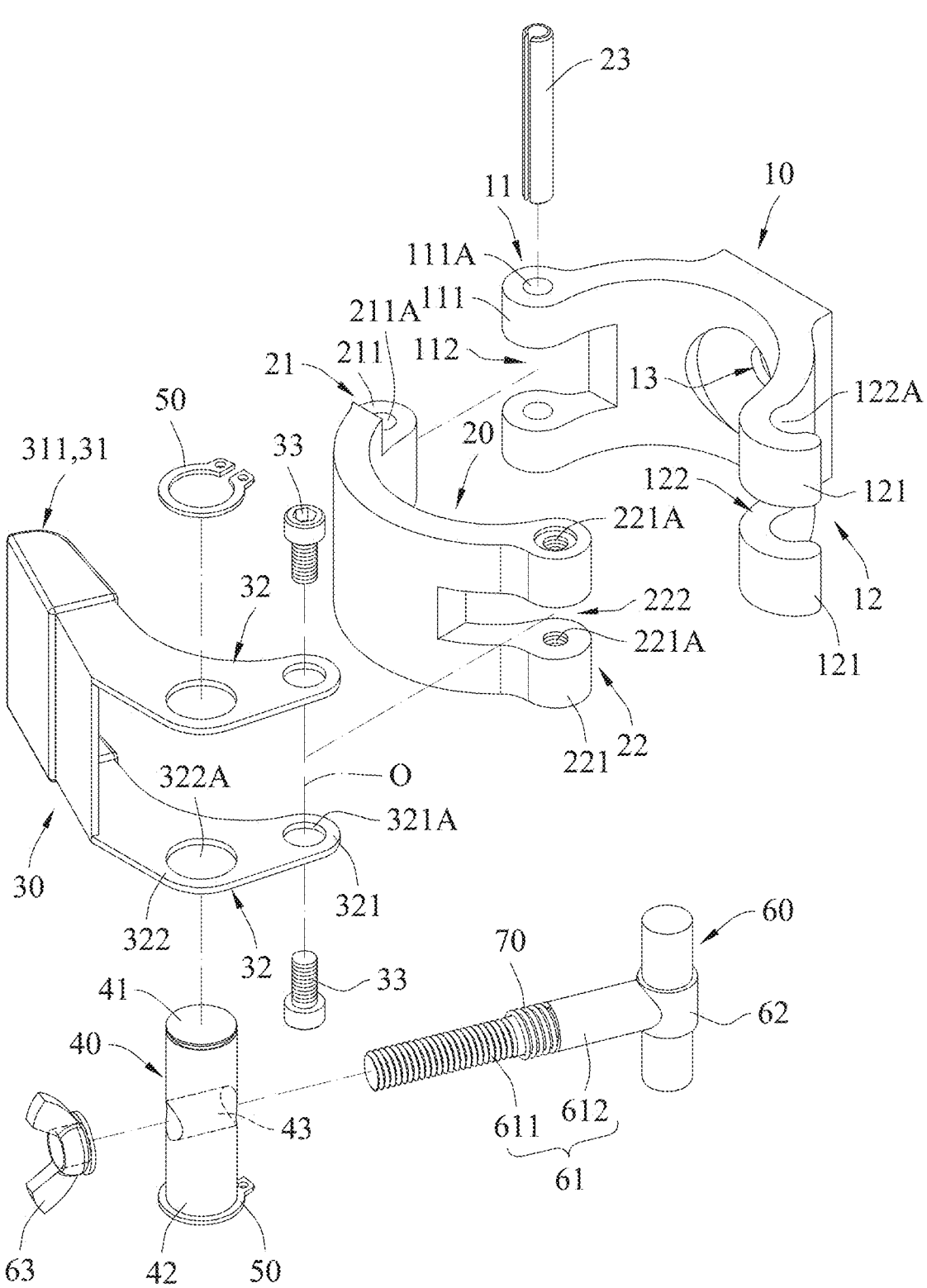
FIG. 2 is an exploded view of the light hook in accordance with the present invention.

This invention provides a light hook, please refer to FIGS. 2-6, which includes the components as follows:

A first fastener 10, generally in an arc shape, includes a first end 11 and a second end 12 opposite to the first end 11. The first end 11 includes two protrusions 111, and there is an assembling space 112 between the two protrusions 111. The two protrusions 111 each include a first through hole 111A. The second end 12 includes two clamping portions 121, and the two clamping portions 121 are in an arc shape. There is a slot 122 between the two clamping portions 121, and one end of the slot 122 is an open end 122A. There is a lifting ring hole 13 between the first end 11 and the second end 12, which is used to lock a lifting ring to fix the light.

A second fastener 20, generally in an arc shape, includes a first connecting end 21 and a second connecting end 22 opposite the first connecting end 21. The first connecting end 21 includes a protruding portion 211. The protruding portion 211 includes a second through hole 211A and is located in the assembling space 112. The second through hole 211A is aligned with the two first through holes 111A, and a connecting pin 23 is inserted through the first through holes 111A and the second through hole 211A to make the second fastener 20 and the first fastener 10 pivotally connected to each other, so that the second fastener 20 can pivot relative to the first fastener 10. The second connecting end 22 includes two locking protrusions 221, and the two locking protrusions 221 are spaced at a distance. An inserting space 222 is formed between the two locking protrusions 221, and the two locking protrusions 221 each have a screw hole 221A.

A pulling member 30 includes a body 31 and two side plates 32, one end of each of the two side plates 32 is connected to two opposite sides of one end of the body 31, and the other end of each of the two side plates 32 is a pivot end 321. Each of the pivot ends 321 includes a pivot hole 321A, and two bolts 33 are respectively inserted through the pivot holes 321A and screwed in the screw holes 221A, the pivot ends 321 and the second fastener 20 together define a pivot center O, so that the pulling member 30 can pivot relative to the second fastener 20 about the pivot center O. The other end of the body 31 that is not connected to the two side plates 32 includes a pulling end 311 for the user to grip. The two side plates 32 each include a connecting portion 322, which is located between the pivot end 321 and the pulling end 311, and each of the connecting portions 322 includes a main hole 322A.

A connecting bar 40, generally cylindrical in shape, includes a first inserting end 41 and a second inserting end 42 opposite the first inserting end 41. The first inserting end 41 is inserted in one of the main holes 322A, the second inserting end 42 is inserted in another of the main holes 322A, and an inserting hole 43 is formed between the first inserting end 41 and the second inserting end 42. When the pulling member 30 pivots around the pivot center O, the connecting bar 40 accordingly swings and displaces around the pivot center O.

Two clamping members 50 are respectively fastened to the first inserting end 41 and the second inserting end 42, so that the connecting bar 40 is fixed between the two side plates 32.

A fixing member 60 includes an inserting portion 61 and a fixing portion 62 connected to each other. The inserting portion 61 and the fixing portion 62 are both cylindrical in shape, and the inserting portion 61 and the fixing portion 62 extend in different directions, so that the fixing member 60 is generally in T-shape. The fixing portion 62 is abutted against the two clamping portions 121, and the inserting portion 61 includes a threaded section 611 and a connecting section 612 sequentially connected to each other. The diameter of the connecting section 612 is greater than that of the threaded section 611. One end of the connecting section 612 that is not connected to the threaded section 611 is connected to the fixing portion 62. The outer surface of the threaded section 611 includes a plurality of threads. The threaded section 611 is inserted through the inserting hole 43, and then a nut 63 is screwed on the threaded section 611 that extends out of the inserting hole 43. The nut 63 is pressed against one side of the connecting bar 40. When the connecting bar 40 pivots and displaces around the pivot center O, the fixing member 60 swings accordingly.

An elastic member 70 is mounted on the threaded section 611, with one end of the elastic member 70 leaning against the connecting section 612 and the other end leaning against the other side of the connecting bar 40.

The above is the configuration relations of the main components of each embodiment of the present invention, as for the operation mode and function of this invention, please refer to the following description.

Figure 6:
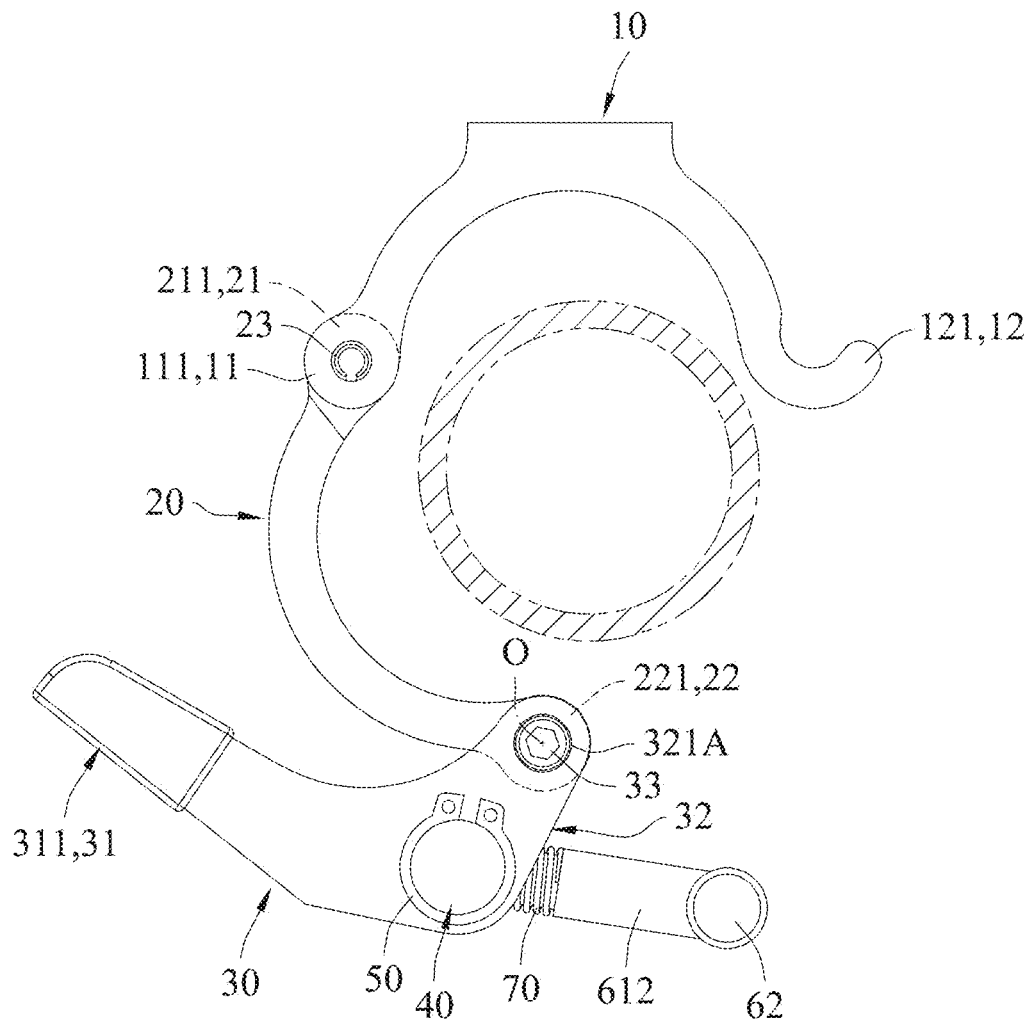
FIG. 6 is a schematic diagram of the invention showing the detachment of the light hook of the invention from the truss or column.

When the user does not fasten the light hook, please refer to FIG. 6, the user only needs to wrap the first fastener 10 and the second fastener 20 around the truss or column to be fastened.

Figure 5:
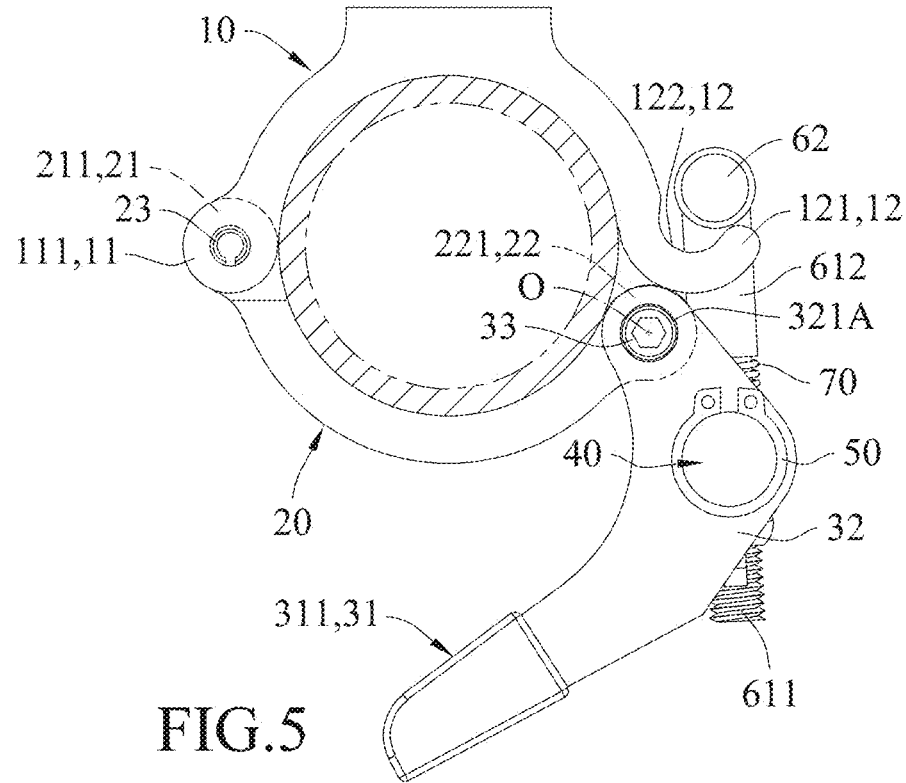
FIG. 5 is a schematic diagram showing that the light hook of the invention is in the unlocked state.

Please refer to FIG. 5, the user drives the pulling member 30 to pivot, which consequently drives the fixing member 60 to move until the inserting portion 61 is inserted into the slot 122, so that the fixing portion 62 is pressed against the two clamping portions 121.

Figure 3:
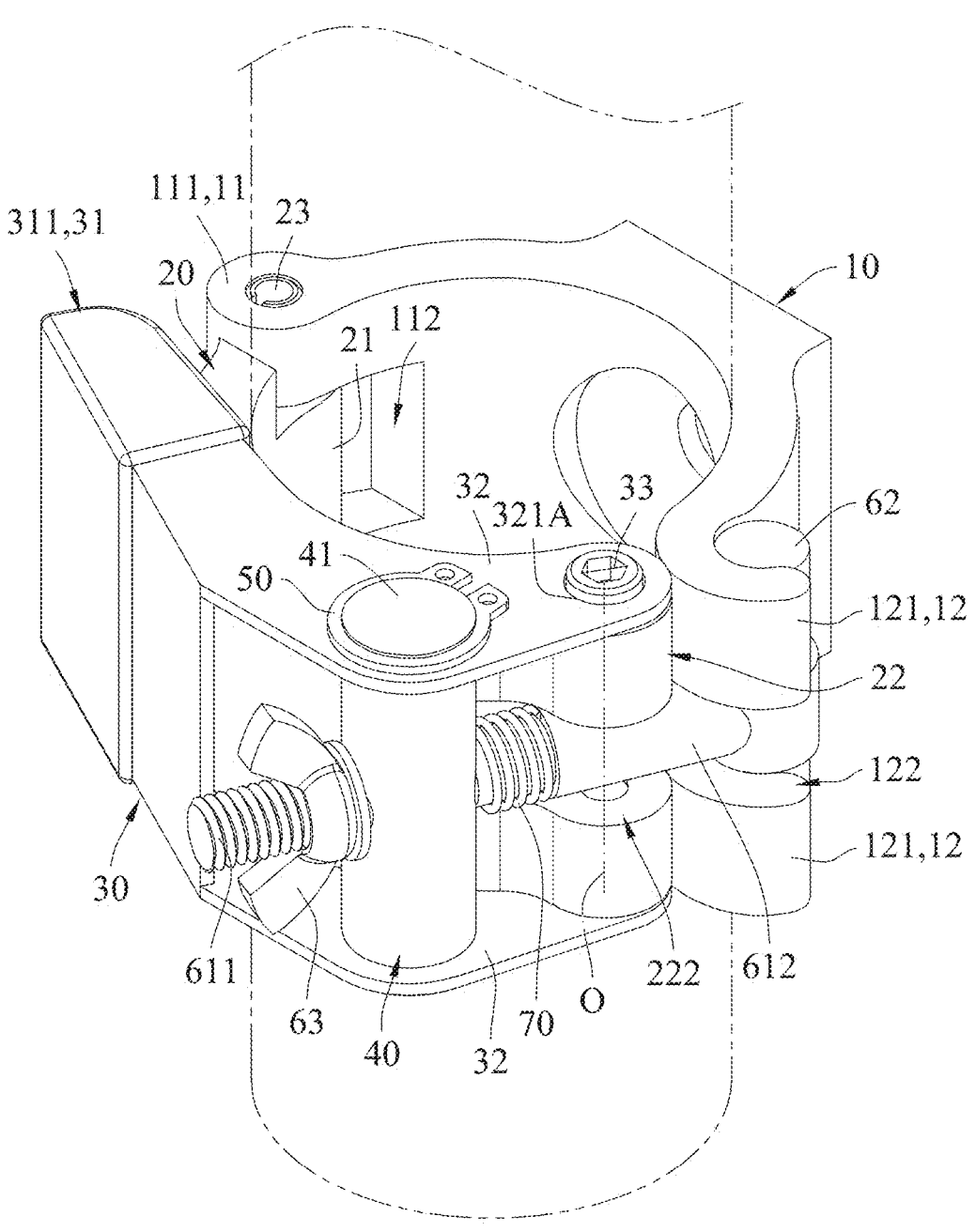
FIG. 3 is a schematic diagram showing that the light hook of the present invention is fastened to the truss or column.
Figure 4:
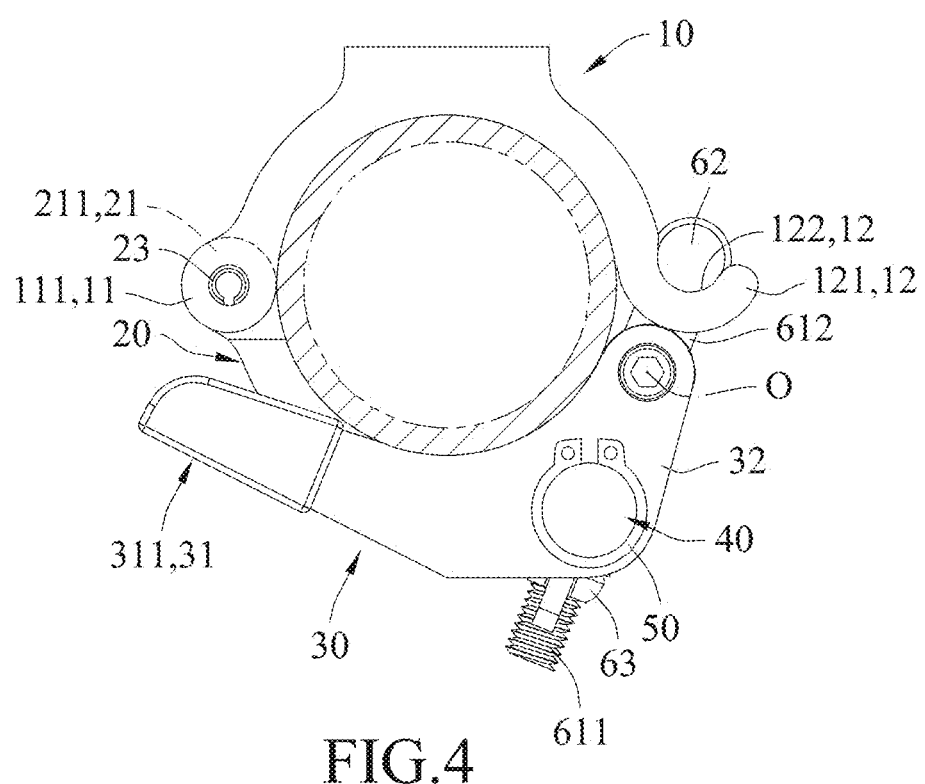
FIG. 4 is a top view showing that the light hook of the present invention is fastened to the truss or column.

Please refer to FIGS. 3 and 4, then the user pulls the pulling end 311 of the pulling member 30 to make the pulling member 30 move close to the second fastener 20, and change the angle of the fixing member 60 to make the fixing portion 62 tightly presses against the two clamping portions 121, and the first fastener 10 and the second fastener 20 embrace around and tightly press against the truss or column to complete the locking action.

Preferably, when the user needs to fine-tune the tightness of the light hook, it is only necessarily to rotate the nut 63 to further tighten the first fastener 10 and the second fastener 20, and make the fixing portion 62 further tightly press against the two clamping portions 121.

On the contrary, when the user needs to release the light hook, he/she only needs to reversely pull the pulling end 311 of the pulling member 30, as shown in FIG. 5, to change the position of the connecting bar 40, which consequently drives the fixing member 60 to move and makes the fixing portion 62 move away from the two clamping portions 121, so that the user can reversely pull the inserting portion 61 out of the slot 122 from the open end 122A, and then the light hook can be unlocked to achieve quick disassembly and assembly.

What is claimed is:

1. A light hook comprising:

a first fastener, one end of the first fastener including two clamping portions, and a slot formed between the two clamping portions, and one end of the slot being an open end;

a second fastener having one end pivotally connected to the first fastener, wherein the second fastener is pivotally connected to another end of the first fastener, another end of the second fastener includes two locking protrusions, the two locking protrusions are spaced at a distance, and an inserting space is formed between the two locking protrusions;

a pulling member including a body and two side plates, wherein one end of each of the two side plates is connected to two opposite sides of one end of the body, and another end of each of the two side plates is a pivot end, each of the pivot ends is swingably and pivotally connected to the second fastener, the pivot ends and the second fastener together define a pivot center, enabling the pulling member to pivot relative to the second fastener about the pivot center, another end of the body is a pulling end, the two side plates each include a connecting portion, which is located between the pivot end and the pulling end;

a connecting bar including a first inserting end and a second inserting end opposite the first inserting end, wherein the first inserting end is fixed to one of the connecting portions, the second inserting end is fixed to another of the connecting portions, and an inserting hole is formed between the first inserting end and the second inserting end, so that, when the pulling member pivots around the pivot center, the connecting bar accordingly swings and displaces around the pivot center; and a fixing member including an inserting portion and a fixing portion connected to each other, wherein the fixing portion is abutted against the two clamping portions, the inserting portion is inserted through the inserting hole, and then a nut is screwed on the inserting portion, so that, when the connecting bar pivots and displaces around the pivot center, the fixing member swings accordingly.

2. The light hook as claimed in claim 1, wherein the first fastener includes a first end and a second end opposite to the first end, the first end includes two protrusions, an assembling space is formed between the two protrusions, the two protrusions each include a first through hole, and the two clamping portions are located at the second end;

the second fastener includes a first connecting end and a second connecting end opposite the first connecting end, the first connecting end includes a protruding portion, the protruding portion includes a second through hole and is located in the assembling space, the second through hole is aligned with the two first through holes, a connecting pin is inserted through the first through holes and the second through hole, and the two locking protrusions are located at the second connecting end.

3. The light hook as claimed in claim 1, wherein the two locking protrusions each have a screw hole, each of the pivot ends includes a pivot hole, and two bolts are respectively inserted through the pivot holes and screwed in the screw holes.

4. The light hook as claimed in claim 1, wherein each of the connecting portions includes a main hole, the first inserting end is inserted in one of the main holes, the second inserting end is inserted in another of the main holes, and two fixing members are respectively fastened to the first inserting end and the second inserting end.

5. The light hook as claimed in claim 1, wherein the two clamping portions are in an arc shape.

6. The light hook as claimed in claim 1, wherein the inserting portion includes a threaded section and a connecting section sequentially connected to each other, a diameter of the connecting section is greater than that of the threaded section, one end of the connecting section that is not connected to the threaded section is connected to the fixing portion, an outer surface of the threaded section includes a plurality of threads, and the nut is screwed on the threaded section and pressed against one side of the connecting bar; and an elastic member is mounted on the threaded section, with one end of the elastic member leaning against the connecting section and the other end leaning against the other side of the connecting bar.

* * * * *